US009255784B2

(12) United States Patent
 Bueno Palacios

(10) Patent No.: US 9,255,784 B2
(45) Date of Patent: Feb. 9, 2016

(54) CONTACTLESS ANGULAR POSITION DETECTION DEVICE

(75) Inventor: César Bueno Palacios, Navarra (ES)

(73) Assignee: PIHER SENSORS & CONTROL S.A. (ES)

( * ) Notice: Subject to any disclaimer, the term of this patent is extended or adjusted under 35 U.S.C. 154(b) by 89 days.

(21) Appl. No.: 14/114,198

(22) PCT Filed: Apr. 25, 2012

(86) PCT No.: PCT/ES2012/000108
§ 371 (c)(1),
(2), (4) Date: Nov. 24, 2013

(87) PCT Pub. No.: WO2012/146802
PCT Pub. Date: Nov. 1, 2012

(65) Prior Publication Data
US 2014/0176130 A1    Jun. 26, 2014

(30) Foreign Application Priority Data

Apr. 27, 2011 (ES) ................ 201100412 U

(51) Int. Cl.
 *G01B 7/30*   (2006.01)
 *G01D 5/14*   (2006.01)
 *G01D 11/24*  (2006.01)

(52) U.S. Cl.
 CPC  *G01B 7/30* (2013.01); *G01D 5/145* (2013.01); *G01D 11/245* (2013.01)

(58) Field of Classification Search
 CPC .................................................. G01D 5/145
 USPC .................................................. 324/207.25
 See application file for complete search history.

(56) References Cited

U.S. PATENT DOCUMENTS

| 4,451,750 | A  | * | 5/1984  | Heuer et al. ........... 310/88 |
| 5,009,311 | A  |   | 4/1991  | Schenk         |
| 6,188,216 | B1 |   | 2/2001  | Fromer         |
| 6,788,048 | B2 |   | 9/2004  | Hedayat et al. |
| 7,439,732 | B2 |   | 10/2008 | LaPlaca        |
| 8,164,327 | B2 |   | 4/2012  | Hoskins et al. |
| 2003/0080732 | A1 | | 5/2003 | Okazaki        |
| 2003/0080734 | A1 | | 5/2003 | Hedayat et al. |
| 2006/0176050 | A1 | | 8/2006 | LaPlaca        |
| 2009/0051352 | A1 | | 2/2009 | Hoskins et al. |

FOREIGN PATENT DOCUMENTS

| EP | 1308692 A      | 5/2003  |
| WO | WO 9535015 A   | 12/1995 |
| WO | WO 2012/146802 A1 | 11/2012 |

* cited by examiner

Primary Examiner — Reena Aurora
(74) Attorney, Agent, or Firm — Hess Patent Law Firm LLC; Robert J. Hess

(57) ABSTRACT

The contactless angular position detection device includes a main casing (1) having a through opening (2) formed about a geometric axis (E) and a rotary element (3) to which a permanent magnet (4) is fixed. The rotary element (3) is mounted inside the main casing (1) to rotate with respect thereto about the geometric axis (E) Further, an electronic circuit 5 is mounted inside the main casing (1) and which includes a sensor (7) capable of detecting variations in the magnetic field produced by the permanent magnet (4) when rotating with respect to the main casing (1), a secondary casing (9) coupled to the main casing (1), and plug connection housed in or supported by the secondary casing (9) for connecting said electronic circuit 5 to the outside. The main casing (1) and secondary casing (9) are permanently and tightly attached.

6 Claims, 3 Drawing Sheets

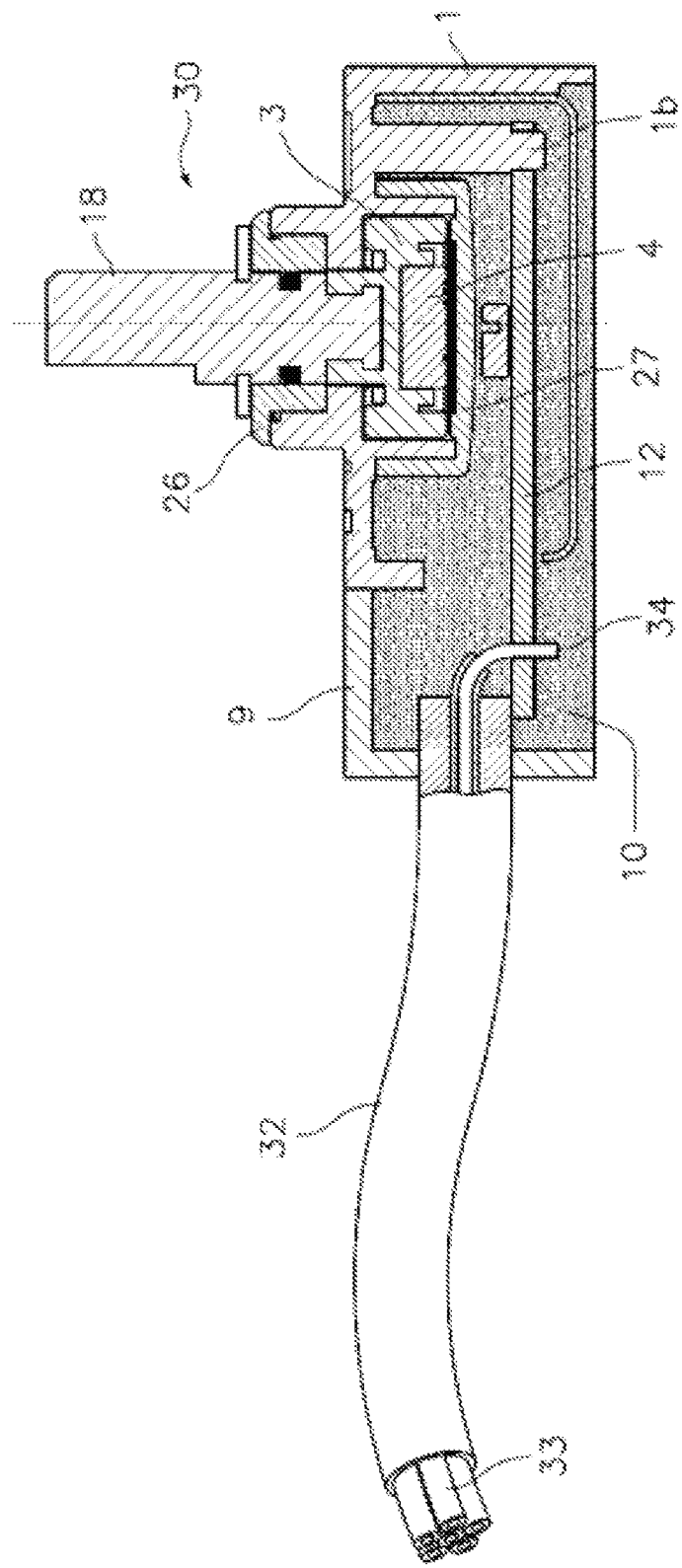

CONTACTLESS ANGULAR POSITION DETECTION DEVICE

FIELD OF THE ART

The present invention relates to a contactless angular position detection device and more particularly to a contactless angular position detection device with a main casing housing a rotor and detection elements and a complementary module including a secondary casing coupled to said main casing. The complementary module is a connection module for connecting the device to the outside.

BACKGROUND OF THE INVENTION

Contactless angular position detection devices are known to comprise a casing with a through opening formed through a wall thereof about a geometric axis; a rotary element to which a permanent magnet is fixed, said rotary element being mounted inside said casing to rotate with respect thereto about said geometric axis; and an electronic circuit mounted inside said casing and which includes a sensor capable of detecting variations in the magnetic field produced by said permanent magnet when rotating with respect to said casing. To connect the electronic circuit to the outside, detection devices of this type comprise either an electrical cable projecting from the casing, connected to said electronic circuit and optionally ending in a connector, or a connector formed by a housing of the casing with contacts connected to the electronic circuit.

A drawback of the mentioned connector formed by a housing of the casing is that since there is a wide range of different connector types, it is necessary to manufacture a wide range of different casing types adapted to the different connector types and to use the casings of either type to assemble angular position detection devices according to the requirements of each particular user.

DISCLOSURE OF THE INVENTION

The present invention contributes to mitigating the foregoing and other drawbacks by providing a contactless angular position detection device, comprising a main casing with a through opening formed through a wall thereof about a geometric axis; a rotary element to which a permanent magnet is fixed, said rotary element being mounted inside said main casing to rotate with respect thereto about said geometric axis; and an electronic circuit mounted inside said main casing and which includes a sensor capable of detecting variations in the magnetic field produced by said permanent magnet when rotating with respect to said main casing. The contactless angular position detection device of the present invention further comprises a complementary module including a secondary casing coupled to said main casing by means of respective coupling configurations, and plug connection means housed in or supported by said secondary casing for connecting said electronic circuit to the outside.

The mentioned main casing and secondary casing are attached by a permanent and tight attachment which in a preferred embodiment is provided by a plastic material mass (initially fluid mass which subsequently hardens) filling part of said main casing and secondary casing (particularly filling the inner hollow spaces) unifying both casings. This plastic mass furthermore partially demarcates the outer surface of both casings, excluding said through opening of the main casing and at least one access opening of the secondary casing through which the mentioned connection means are accessed.

In one embodiment, the complementary module is a connection module in which the connection means are contacts which are electrically connected with the respective output terminals of the electronic circuit when the main casing and secondary casing are mutually coupled in an operating position. For example, the electronic circuit including the mentioned sensor is mounted on a printed circuit board housed inside said main casing and has a series of output terminals in the form of metal-coated holes formed in the printed circuit board, whereas the contacts of the connection module are connection plugs housed in a cavity communicated with said access opening of the secondary casing, where the connection plugs have at an inner end thereof a series of corresponding connection pins or prongs which are inserted in said metal-coated holes of the printed circuit board for being connected with the output terminals of the electronic circuit.

This construction has the advantage of allowing a more practical and cost-efficient method of manufacture compared to devices of the state of the art. For example, on one hand angular position detection devices can be assembled during manufacture using a single type of main casing, and on the other hand complementary modules can be assembled during manufacture using one or more secondary casings according to different connector types, and angular position detection devices can subsequently be assembled with the desired complementary modules by coupling their respective main casing and secondary casing.

BRIEF DESCRIPTION OF THE DRAWINGS

The foregoing and other features and advantages will be more fully understood from the following detailed description of an embodiment with reference to the accompanying drawings, in which:

FIG. 4 is also a cross-section view, but with a different circuit board, a different secondary casing and a multifilament connection cable.

DETAILED DESCRIPTION OF AN EMBODIMENT

Figure 1:
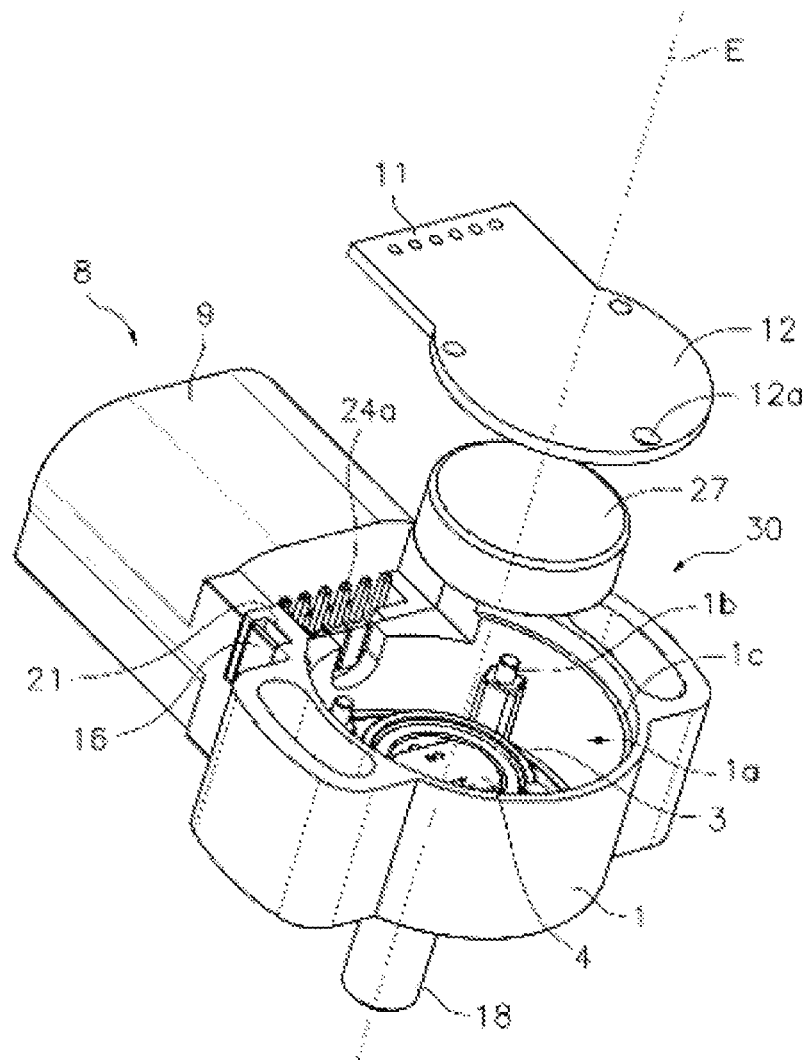
FIG. 1 is a partially exploded perspective view of a contactless angular position detection device according to an embodiment of the present invention.
Figure 2:
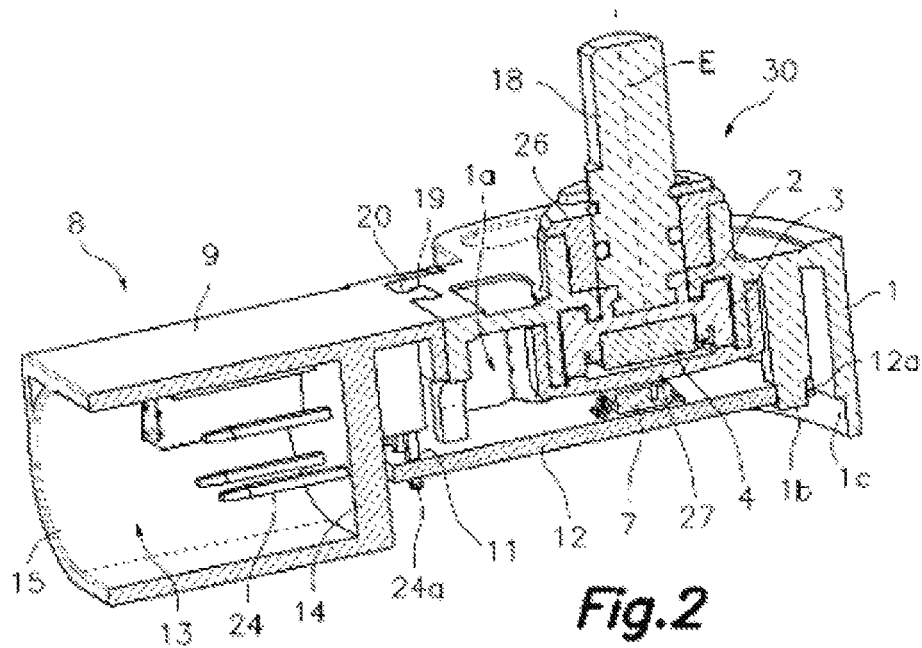
FIG. 2 is a cross-section view of the device of FIG. 1 showing a main casing and a secondary casing assembled together.

Referring first to FIGS. 1 and 2, a contactless angular position detection device according to an embodiment of the present invention is shown, comprising a main module 30 installed in a main casing 1 having a through opening 2 formed about a geometric axis E, and a complementary module 8 including a secondary casing 9 coupled to said main casing 1 by means of respective coupling configurations comprising projecting ribs 19 formed in said secondary casing 9 inserted in corresponding grooves 20 defined in the main casing 1.

Said projecting ribs 19 and grooves 20 are arranged in a direction parallel to said geometric axis E, such that the coupling of both main casing and secondary casing 1, 9 is done by means of a relative movement in a direction parallel to said geometric axis E. One of the two casings, for example the secondary casing 9, preferably includes elastic arms 16 (FIG. 1) ending in projections fitting in recesses 21 of the other casing, for example the main casing 1, for retaining the main casing and secondary casing 1, 9 coupled in an operating position.

A rotary element 3 which can rotate with respect to the main casing 1 about said geometric axis E is mounted in a cavity 1a of the main casing 1. Said rotary element 3 comprises a permanent magnet 4 and is fixed to an actuation stem 18 projecting out of the main casing 1 through said through opening 2. A dynamic gasket 26 is arranged between the through opening 2 and the actuation stem 18. A stationary cover 27 fixed to the main casing 1 covers the inner end of the rotary element 3 and the permanent magnet 4 inside said cavity 1a.

Figure 3:
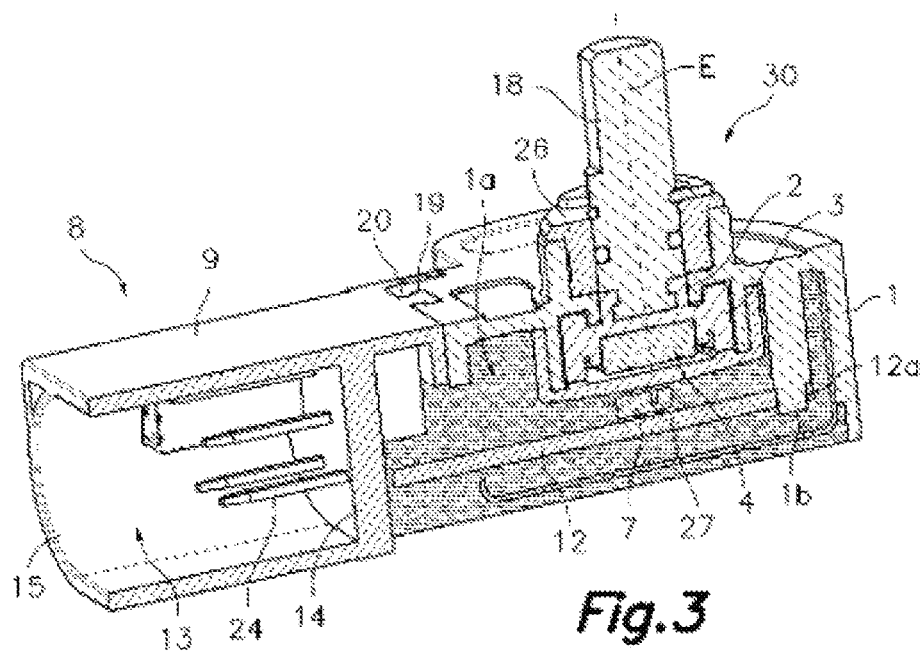
FIG. 3 is a cross-section view similar to FIG. 2, but showing the filling in of the inner gaps of the main casing and secondary casing with a plastic mass.

As shown in FIG. 3, the contactless angular position detection device of the present invention comprises a plastic mass 10 occupying part of said main casing 1 and secondary casing 9 filling in the inner gaps and contributing to the attachment between both casings. The mentioned plastic mass does not block the through opening 2 of the main casing 1 and the access opening 15 of the secondary casing 9 through which the connection means are accessed. Therefore, said plastic mass 10 provides a permanent and tight attachment between the main casing and secondary casing 1, 9.

A printed circuit board 12 bearing an electronic circuit 5 including a sensor 7 capable of detecting variations in the magnetic field produced by said permanent magnet 4 when rotating with respect to said main casing 1 is also housed inside the cavity 1a of the main casing 1. Lugs 1b formed in the main casing 1 are inserted through holes 12a of said printed circuit board 12 and riveted for holding the printed circuit board 12 inside the main casing 1 in a position such that the mentioned sensor 7 is arranged adjacent to said stationary cover 27 and substantially aligned with the permanent magnet 4 and with said geometric axis E. The electronic circuit 5 has output terminals 11 in the form of metal-coated holes formed at one end of said printed circuit board 12 adjacent to the secondary casing 9 of said complementary module 8. The cavity 1a of the main casing 1 is closed by the mentioned filling plastic material mass.

The complementary module 8 includes electric plug connection means housed in or supported by the secondary casing 9 and arranged for connecting the electronic circuit 5 to the outside. In the illustrated embodiment, the complementary module 8 is a connection module and the secondary casing 9 defines a housing 13 with a back wall 14 adjacent to the main module 30 and an access opening 15 opposite said back wall 14. The mentioned plug connection means comprise a series of connection plugs 24 supported in the back wall 14. Said connection plugs 24 go through the back wall 14 and have at an inner end corresponding pins or prongs 24a bent at an angle and aligned in directions parallel to the direction of the projecting ribs 19 and grooves 20. The mentioned pins 24a are configured for being plugged into the mentioned metal-coated holes of the printed circuit board 12, which form the output terminals 11 of the electronic circuit 5.

Therefore, when the main casing and secondary casing 1, 9 are mutually coupled by a relative sliding of their respective projecting ribs 19 and grooves 20, the pins 24a are automatically plugged into the metal-coated holes of the printed circuit board 12 and the connection plugs 24 are electrically connected with the respective output terminals 11 of the electronic circuit 5.

Although the electronic circuit 5 is installed only in the printed circuit board 12 housed inside the main casing 1 in the embodiment illustrated in FIGS. 2 and 3, in the alternative embodiment of FIG. 4 part of the electronic circuit 5 is installed on a printed circuit board prolonging towards the inside of an oversized secondary casing 9 of the complementary module 8. In another embodiment not shown, an auxiliary board could be used for part of circuit installed in the aforementioned complementary module 8.

A method of manufacturing the contactless angular position detection device of the present invention can comprise, for example, assembling on one hand the components required for forming a plurality of main modules 30, and on the other hand the components required for forming a plurality of complementary modules 8, with the particularity that the complementary modules 8 can be of different types adapted to different configurations of the plug connection means; then coupling the main modules 30 with complementary modules 8 of a type selected from among the several available types; and finally applying said plastic mass 10 filling in the inner free gaps of the main casing and secondary casing assembly 1, 9.

The main casing 1 and secondary casing 9 are thus permanently and tightly attached, unified by the plastic mass 10 filling in the inner gaps of both casings 1, 9. This method of manufacture has the advantage of being able to manufacture contactless angular position detection devices adapted to several types of connection means, including virtually any type of on-demand connection means, changing only the configuration of the secondary casing 9 of the complementary module 8 and its connection plugs 24.

Modifications and variations based on the embodiment shown and described will readily occur to a person skilled in the art without departing from the scope of the present invention as defined in the attached claims. Particularly, the secondary casing 9 could adopt different configurations and its outlet port could be oriented as shown in the example or at 90 degrees from it, or with any inclination.

The invention claimed is:

1. A contactless angular position detection device, comprising:
   a main casing having a through opening formed about a geometric axis;
   a rotary element to which a permanent magnet is fixed, said rotary element being mounted inside said main casing to rotate with respect thereto about said geometric axis;
   an electronic circuit mounted inside said main casing, said electronic circuit including a sensor capable of detecting variations in the magnetic field produced by said permanent magnet when rotating with respect to said main casing;
   a complementary module including a secondary casing coupled to said main casing by means of respective coupling elements in said secondary and main casings, and
   electric connection plugs, said main casing and secondary casing being permanently and tightly linked by attachment means;
   wherein said complementary module is a connection module provided with a series of connection plugs housed in a cavity communicated with an access opening of the secondary casing for connecting said electronic circuit to outside said main casing, said connection plugs having at an inner end thereof corresponding pins or prongs electrically connected with respective output terminals of said electronic circuit, and
   wherein said respective coupling elements comprise:
      projecting ribs formed in said secondary casing; and
      corresponding grooves defined in the main casing in correspondence with the projecting ribs, the projecting ribs and the corresponding grooves being configured and arranged relative to each other for insertion of the projecting ribs into corresponding grooves, said projecting ribs projecting parallel to said geometric axis and said corresponding grooves extending parallel to said geometric axis such that a coupling of both main casing and secondary casing is obtained by means of a relative movement in a direction parallel to said geometric axis.

2. The detection device according to claim 1, further comprising a plastic material mass occupying the inner gaps or free spaces of said main casing and secondary casing cooperating in attachment between both.

3. The detection device according to claim 2, wherein said plastic material mass excludes said through opening of the main casing and at least one access opening of the secondary casing through which said connection means are accessed.

4. The detection device according to claim 1, wherein said pins or prongs of said connection plugs are bent at an angle and aligned in directions parallel to the direction of said projecting ribs and grooves so that the pins or prongs are automatically plugged into metal-coated holes provided in the printed circuit board when said secondary casing and said main casing are coupled to each other, said metal-coated holes constituting said output terminals of the electronic circuit.

5. The detection device according to claim 1, wherein one of the main casing and secondary casing includes elastic arms ending in projections fitting in recesses of the other casing for retaining the main casing and secondary casing coupled in an operating position.

6. The detection device according to claim 1, wherein the electronic circuit is mounted on a printed circuit board housed in the main casing, and said output terminals of the electronic circuit are in the form of metal-coated holes formed in said printed circuit board and configured for receiving said pins.

* * * * *